(12) United States Patent
Hazenbroek et al.

(10) Patent No.: US 8,535,122 B2
(45) Date of Patent: Sep. 17, 2013

(54) METHOD AND APPARATUS FOR AUTOMATIC MEAT PROCESSING

(75) Inventors: Jacobus Eliza Hazenbroek, Oud-Beijerland (NL); Albert Hugo de Vree, Rontgenstrast (NL)

(73) Assignee: Foodmate B.V., Oud-Beijerland (NL)

( * ) Notice: Subject to any disclaimer, the term of this patent is extended or adjusted under 35 U.S.C. 154(b) by 608 days.

(21) Appl. No.: 12/797,909

(22) Filed: Jun. 10, 2010

(65) Prior Publication Data

US 2010/0317272 A1 Dec. 16, 2010

(51) Int. Cl.
*A22C 17/12* (2006.01)

(52) U.S. Cl.
USPC ......................................................... 452/125

(58) Field of Classification Search
USPC ........................... 452/74, 76, 77, 81; 426/332
See application file for complete search history.

(56) References Cited

U.S. PATENT DOCUMENTS

| | | | | |
|---|---|---|---|---|
| 3,025,170 | A | * | 3/1962 | Murphy et al. ............... 426/332 |
| 3,108,883 | A | | 10/1963 | Goeser |
| 3,151,991 | A | | 10/1964 | Emrys |
| 3,255,599 | A | * | 6/1966 | Morrison ......................... 62/63 |
| 3,304,733 | A | * | 2/1967 | Coffman ......................... 62/100 |
| 3,424,104 | A | | 1/1969 | Allen |
| 3,479,688 | A | * | 11/1969 | Hoersch ......................... 452/52 |
| 3,523,891 | A | * | 8/1970 | Mehl .............................. 210/707 |
| 3,546,114 | A | * | 12/1970 | Moller, Jr. et al. ............ 210/760 |
| 3,926,080 | A | | 12/1975 | Bettcher |
| 4,164,129 | A | | 8/1979 | Stueber |
| 4,367,630 | A | | 1/1983 | Bernard |
| 4,388,811 | A | | 6/1983 | Zebarth |
| 4,468,838 | A | | 9/1984 | Sjostroem |
| 4,558,490 | A | | 12/1985 | Hazenbroek |
| 4,597,136 | A | | 7/1986 | Hazenbroek |
| 4,788,749 | A | | 12/1988 | Hazenbroek |
| 4,893,378 | A | | 1/1990 | Hazenbroek |
| 4,896,399 | A | | 1/1990 | Hazenbroek |
| 4,952,223 | A | | 8/1990 | Kirshnamurthy |
| 5,069,652 | A | | 12/1991 | Hazenbroek |
| 5,147,240 | A | | 9/1992 | Hazenbroek |
| 5,154,664 | A | | 10/1992 | Hazenbroek |
| 5,205,779 | A | | 4/1993 | O'Brien |
| 5,487,700 | A | | 1/1996 | Dillard |
| 5,878,582 | A | | 3/1999 | Appolonia |
| 6,764,393 | B1 | | 7/2004 | Hazenbroek |
| 6,912,434 | B2 | | 6/2005 | van den Nieuuelaar et al. |
| 7,083,510 | B2 | * | 8/2006 | Caracciolo, Jr. ................ 452/81 |
| 7,134,958 | B2 | | 11/2006 | Gagliardi, Jr. |

FOREIGN PATENT DOCUMENTS

| | | |
|---|---|---|
| EP | 0024159 | 11/1983 |
| EP | 0250318 | 12/1987 |
| EP | 0381093 | 8/1990 |
| EP | 0667503 | 6/1999 |

(Continued)

*Primary Examiner* — Richard Price, Jr.

(74) *Attorney, Agent, or Firm* — Maryellen Feehery Hank Reed Smith LLP

(57) ABSTRACT

Meat processing method and apparatus for automatically cutting individual poultry or fowl carcasses into various meat products, including conveying at least one previously eviscerated individual carcass along a path of conveyance and through a freezing unit arranged for allowing at least a portion of the at least one carcass to become frozen and conveying the at least one carcass, upon its exit from the freezing unit, to a cutting station downstream of the freezing unit for performing at least one partial cut through a frozen portion of the at least one carcass.

29 Claims, 9 Drawing Sheets

(56) References Cited

FOREIGN PATENT DOCUMENTS

| | | |
|---|---|---|
| EP | 1490637 | 12/2004 |
| FR | 2534454 | 4/1984 |
| WO | 8200001 | 1/1982 |
| WO | 84/01691 | 5/1984 |

* cited by examiner

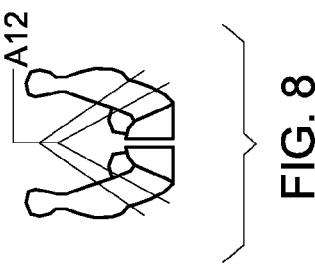
FIG. 1
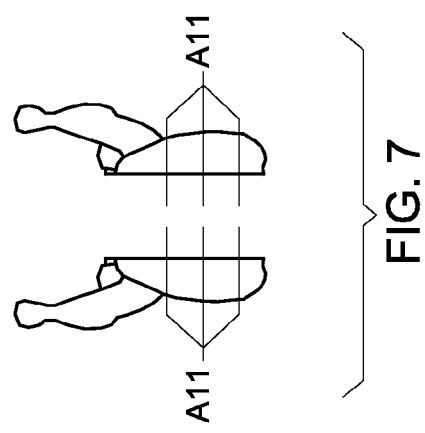
FIG. 2
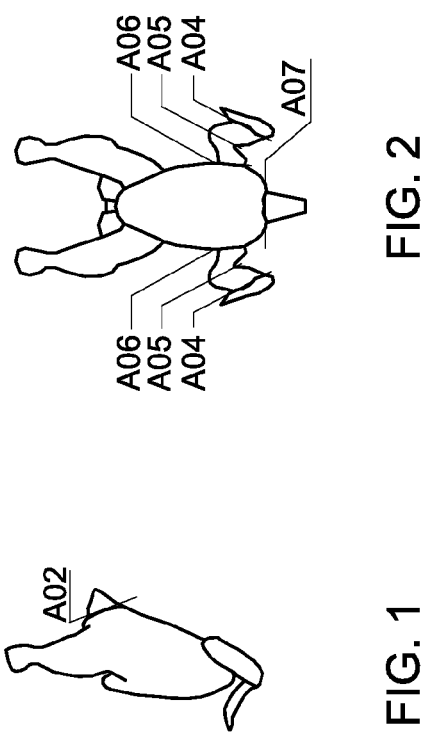
FIG. 7
FIG. 8
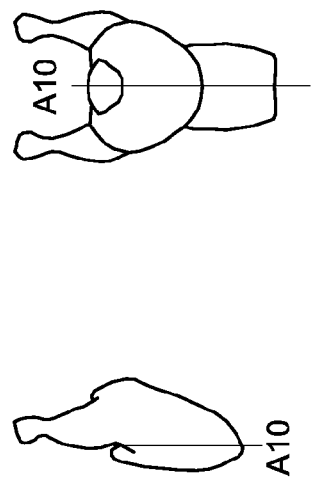
FIG. 3
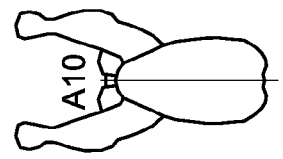
FIG. 4
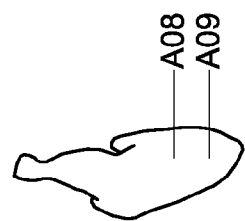
FIG. 5
FIG. 6

METHOD AND APPARATUS FOR AUTOMATIC MEAT PROCESSING

RELATED APPLICATIONS

This application is a US Application claiming priority from Foreign Application No. NL 2002992, filed Jun. 10, 2009, which is herein incorporated by reference.

The invention relates to a method and apparatus for automatically cutting individual poultry or fowl carcasses into a plurality of pieces forming various meat products.

Such an apparatus is generally known from patent publication U.S. Pat. No. 4,468,838. This known arrangement generally relates to a method and apparatus of making food products from a bird. Birds, such as poultry and fowl, are conventionally eviscerated, processed and sold as severed parts, i.e., breasts, wings, drumsticks, thighs, etc. In recent years there has been an increasing interest in different meat products, particularly products that are easier to prepare and which yield little or no waste. While in this connection there has been a demand for cutting up individual bird carcasses into an increasing number of smaller meat products, this demand could not be fully served by the known method and apparatus for automatically cutting up bird carcasses. Especially with arrangements that suspend the bird carcasses from modules in an overhead conveyor, a drawback has been that after each cutting step the integrity of the carcass is reduced. This makes it increasingly difficult to devise automatic cutting arrangements that allow an increased number of smaller meat portions to be obtained, without the requirement of additional manual labour. It has also been found difficult to obtain accurate cuts of a carcass that has partially lost its integrity. A further limitation associated with overhead conveying systems that suspend bird carcasses from their legs in an inverted position is that meat portions have to be removed from the neck portion upward towards the legs.

It is therefor an object of the present invention to provide an improved method and apparatus for automatically for automatically cutting individual poultry or fowl carcasses into pieces forming various meat products. In a more general sense it is thus an object of the invention to overcome or ameliorate at least one of the disadvantages of the prior art. It is also an object of the present invention to provide alternative methods and structures which are less cumbersome in assembly operation and assembly and which moreover can be performed relatively inexpensively. Alternatively it is an object of the invention to at least provide the public with a useful choice.

To this end the invention provides a method of automatically cutting individual poultry or fowl carcasses into pieces forming various meat products, the method including: conveying at least one previously eviscerated individual carcass through a freezing unit and allowing at least a portion of the at least one carcass to become frozen, conveying the at least one carcass, upon its exit from the freezing unit, to a cutting station, and performing at least one partial cut through the frozen portion of the carcass. Such a method enables the structural integrity of a carcass to be maintained during successive cutting steps or to reestablish the integrity of a partial cut carcass to permit further cuts to be accurately made. The method according to the invention is particularly useful when the step of conveying includes suspending a plurality of carcasses, including the at least one carcass, individually in an inverted position from modules in an overhead conveyor and moving the suspended carcasses in spaced relationship along a processing path, including the freezing unit.

In the method according to the invention it is further useful when prior to entering the freezing unit, the tail and the wing tips are removed from each individual carcass. Such extremities contain only neglectable amounts of meat and are very thin. Once frozen, these parts would be difficult to remove. Being able to discard these parts is important, because these are not a meat product for the consumer market. In this regard it may also be advantageous when the step of removing the tail while moving the carcasses downstream along the processing path includes first engaging each individual carcass by a tail cutter and severing its tail. It would then be particularly advantageous when the step of removing the wing tips includes continuing moving each individual carcass downstream along the processing path and engaging it by a wing tip cutter and severing both its wing tips simultaneously. Given that the thinner extremities of a bird's carcass are more prone to freezing than the meatier portions it may also be advantageous when prior to entering the freezing unit the remaining wing elements are also removed from each carcass. This can advantageously be accomplished by further including a step of engaging each individual carcass when moving downstream of the wing tip cutter by at least one wing cutter, and removing the remaining wing elements from the carcass. Advantageously a step of collecting the remaining wing elements on a first transport means may then be added. Also a wing center piece may be severed from the wing downstream of the wing tip cutter and upstream of the at least one wing cutter.

In a particularly favourable embodiment of the method according to the invention the step of performing at least one partial cut may include successively engaging each individual carcass downstream of the freezing unit by a breast pre cutter and making the at least one partial incision across a breast portion of the individual carcass. It can further be desirable when the step of pre cutting the breast portion of the individual carcasses includes making a pair of incisions, one above the other. In particular crust freezing of a portion to be cut repeatedly ensures that sufficient integrity remains in the carcass to enable accurate cuts for the required meat products to be obtained. In combination the method of the invention is also particularly useful when further including moving each individual carcass downstream of the pre cutter in succession to a carcass splitter and making at least one cut between the breast and back portions of the individual carcass, which cut intersects with opposite ends of the at least one partial incision made upstream of the carcass splitter. In this way meat products can be obtained that require cutting in directions substantially perpendicular to one another. Hitherto meat product requiring precise cutting in several directions could only be obtained in time consuming manual labour. Advantageously the method of the invention further include collecting the severed breast portions onto a second transport means. Also the step of splitting the carcasses additionally may include cutting between the legs of an individual carcass to obtain a pair of half-carcasses, from which the breast portion is severed.

In a further embodiment of the invention, the steps of performing at least one partial cut and moving each individual carcass downstream of the pre cutter in succession to a carcass splitter can also be further continued by successively engaging each individual carcass or half-carcass downstream of the carcass splitter by a back cutter and cutting the back into a plurality of separate back pieces and collecting these pieces onto the second transport means. Likewise the method can still further include engaging each leg remaining from the individual carcass or half-carcass downstream of the back cutter by a thigh and drumstick cutter, thereby cutting the legs into a plurality of separate leg pieces, and collecting the plurality leg pieces onto the second transport means. In this way up to 25, or more distinct meat products may be obtained from an individual carcass of a bird.

It may be further advantageous in combination with appropriate embodiments as recited above when the method according to the invention further includes collecting leg remnants from the modules of the overhead conveyor onto the second transport means downstream of the tight and drumstick cutter, and joining all pieces transported by the first and second transport means and collecting these for further processing.

In a further advantageous embodiment of the method, a neck skin may be removed from the at least one individual carcass prior to its entering into the freezing unit. Carcasses that are processed by the method according to the invention may be received from automatic slaughtering and eviscerating equipment, which may not always remove the neck skin. Maintaining and freezing of the remaining neck skin serves no purpose in the present invention and its removal prior to freezing can benefit the subsequent processing by the method of the invention.

In a particular advantageous embodiment the freezing unit is a tunnel containing a refrigerating gaseous atmosphere. Freezing in this manner satisfies food processing regulations such as applicable in the European territory.

In an alternative embodiment the method according to the invention the freezing unit may also be a freezing bath containing a refrigerating liquid. This manner of cooling is permitted and popular in the United States of America. Irrespective of the particular means of freezing, the results obtained by the present invention are equally favourable.

The invention also includes a meat processing apparatus for automatically cutting individual poultry or fowl carcasses into pieces forming various meat products, the apparatus including conveying means for conveying at least one previously eviscerated carcass in a direction and path of conveyance, a freezing unit for receiving the at least one carcass along the path of conveyance, having an entrance upstream of the conveyance direction and an exit downstream of the conveyance direction, the freezing unit being arranged for allowing at least a portion of the at least one carcass to become frozen, and a cutting station downstream of the freezing unit for performing at least one partial cut through a frozen portion of the at least one carcass. The apparatus according to the invention thus enables the structural integrity of a carcass to be maintained during successive cutting steps or to reestablish the integrity of a partial cut carcass to permit further cuts to be accurately made. In particular the conveying means can include an overhead track system and a plurality of shackle modules moveable along the overhead track system in spaced relationship, each shackle module can thereby be arranged to suspend one individual carcass in an inverted position.

As the freezing unit a tunnel can advantageously be used that contains a refrigerating gaseous atmosphere. Such a refrigerating gaseous atmosphere can advantageously be created by allowing an injected cryogenic liquid to evaporate. Thereby injection of the cryogenic liquid is preferably controlled by a temperature sensor.

It is also advantageous when the freezing unit is provided with extraction means in the form of a forced exhaust to control flow of the gaseous atmosphere. Thus cooling gas with a temperature exceeding a predefined value can be extracted. Full vaporization of the cryogenic liquid and vapour is a first objective that can be achieved by such forced exhaust in combination with controlled injection of fresh cryogenic liquid. A further objective that can be achieved by controlled supply and extraction includes prevention of cryogenic gases escaping through product entrance and exit of the freezing tunnel, but also ambient air entering the tunnel via the same openings. Such extraction means are preferably provided adjacent the carcass entrance and carcass exit of the cooling tunnel.

Preferably gas agitation or circulation means are provided in the freezing tunnel in the form of at least one fan or propeller to create a turbulence of the gaseous atmosphere or cooling gases in a transverse direction of the freezing tunnel. It has been found that such turbulence improves and intensifies the temperature exchange by contact between carcasses in the tunnel and the cryogenic vapour.

In general it can be advantageous to have the conveyor extend outside of the freezing tunnel. On the one hand this reduces absorption of useful cooling energy by metal masses of the conveyor system and on the other hand it avoids thermal stresses in the conveyor system. An overhead conveyor can thus be positioned above the freezing tunnel and can have its shackle modules extend into the freezing tunnel from an elongate slit in a top wall of the tunnel.

The cutting station downstream of the freezing unit is preferably breast precutter that performs at least one partial incision across a breast portion of an individual carcass. Such a breast precutter advantageously includes at least one mandrel for insertion into the visceral cavity of an individual carcass to accurately position and rigidly support the breast portion thereof.

Further advantageous aspects of the invention will become clear from the appended description of preferred embodiments.

The invention will now be described in reference to the accompanying drawings, in which:

FIGS. 1 through 8 show successive cutting steps performed on an individual poultry carcass by one method and apparatus according to the invention;

FIGS. 1 through 8 generally illustrate how the successive cutting steps are performed on a chicken carcass by the method and apparatus according to the invention. In FIG. 1 a side elevation is shown of a chicken carcass in an invented position in which it is processed by the invention. In particular FIG. 1 illustrates the cutting line according to which the tail is removed by a tail cutting step A02. FIG. 2 shows the cutting lines of successive cutting steps A04 to A07 in a breast elevation of the carcass. Cutting step A04 is the removing of the wing tips by a wing tip cutter. The tail and the wing tips removed by the steps A02 and A04 are usually collected separately from the meat products obtained by the process and apparatus of the present invention, which focuses on fast food or consumer meat products. The tail and wing tips of chicken are not popular as consumer meat products, but can be further processed to be incorporated into other food products suitable for human or animal consumption. Cutting step A05 represents the removal of the wing center piece and cutting step A06 is the removal of the wing root section or upper arm part. Cutting step A07 is the removal of the neck skin, which may have been left on the carcass by a previous slaughtering and eviscerating procedure. The cutting step A07 is therefore optional in the present invention. In FIG. 3 partial cuts, which are made by breast precutting steps A08 and A09 are shown in a side elevation opposite to the side elevation of FIG. 1. A first longitudinal cut of the breast splitter step A10 is shown in FIG. 4 in a breast elevation similar to FIG. 2. A second longitudinal cut of the breast splitter step A10 is shown in FIG. 5 in a side elevation similar to FIG. 1. FIG. 6 shows again the first longitudinal cut performed by the breast splitter step A10 in a back elevation of the chicken carcass. In FIG. 7 is illustrated how the back portion of the carcass, halved by the first longitudinal cut of breast splitter step A10, is divided by three simultaneous cuts in back cutting step A11. FIG. 8 shows a final cutting step A12 in which the thighs and drumsticks are separated from the remaining carcass halves.

Figure 9:
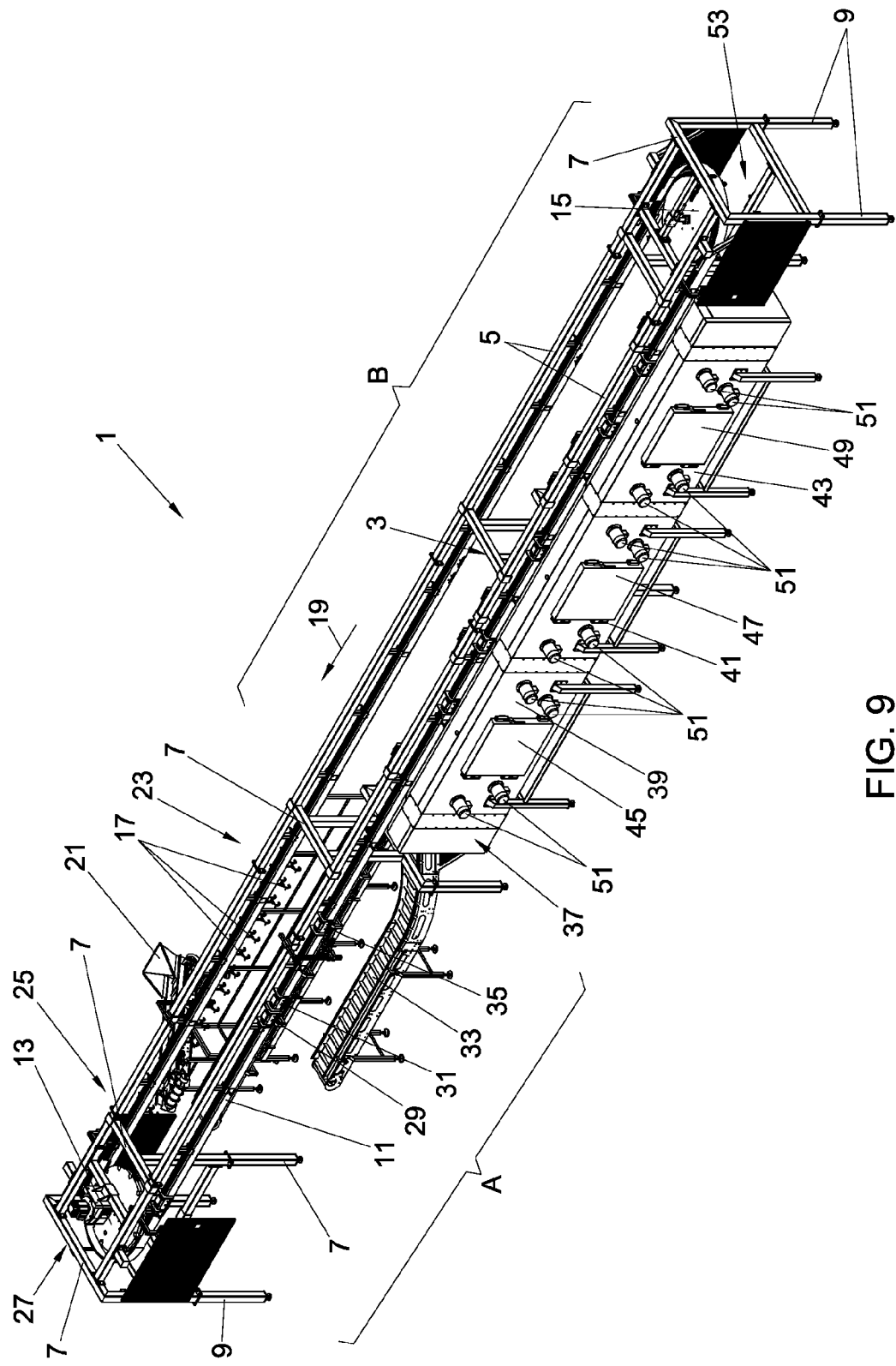
FIG. 9 is a perspective view of a meat processing apparatus according to the invention.

FIG. 9 is a perspective view from above showing an apparatus 1 according to the invention which can be popularly referred to as a bird or chicken cutting plant. The apparatus 1 includes a frame 3, comprising a plurality of longitudinal transverse beams 5, 7 and uprights 9 to support an overhead conveyor track 11. The overhead conveyor track 11 is conventionally a chain conveyor and is arranged in an endless loop with the opposite first and second return sprocket wheels 13, 15. It is to be understood that the arrangement of the overhead conveyor track 11 can be adapted to have a form that is commensurate with an outline of a building into which it is to be operated, by incorporating additional sprocket wheels where appropriate.

Arranged along a path defined by the overhead track 11 are a number of successive processing stations that will be described in more detail herein below. The overhead conveyor track 11 carries a plurality of carcass suspension hooks or shackles 17 forming part of modules, which are moved along the path of the conveyor in spaced apart relation in the direction of arrow 19. The carcass suspension shackles 17 are generally depending from carriage modules in a conventional manner as disclosed in the aforementioned U.S. Pat. No. 4,468,838 patent publication. Such shackles or hooks may additionally be rotatably adjustable at 90° increments as disclosed in U.S. Pat. No. 5,487,700 to vary the position of the carcass in relation to the overhead track 11.

Notably the apparatus can be provided with an infeed conveyor 21 for supplying previously slaughtered and eviscerated poultry carcasses thereto. The individual carcasses in feeding station 23 are then hung up on the suspension shackles 17, in this embodiment by manual labour. Conveniently the shackles 17 are formed into a yoke or fork to each receive a lower leg part, such as ankle bones, of the poultry or chicken carcass in a manner well known to persons skilled in the art.

Upon conveyance from the feeding station 23 each successive carcass passes a suitable tail cutting station, of which the location in FIG. 9 is indicated by reference number 25, for effecting the cutting step A02. After passage through the tail cutting station 25, each successive carcass may optionally be processed by a fat pulling station 27 of known design. Such an optional fat puller 27, for removing fat from the internals of the carcasses may conveniently be combined with the first return sprocket wheel 13 as is shown for this embodiment. The individual carcasses conveyed along the conveyor track 11, then progress through a wing tip cutter 29 where cutting step A04 is performed simultaneously on both wings. A next cutting station in the conveyor path is wing center piece cutter 31, where cutting step A05 is performed. The cut off wing center pieces are collected in collecting trays of pockets on a first belt conveyor 33 running underneath the overhead conveyor track 11. Next the cutting step A06, to remove the upper arm portion of the wings, will be performed in by wing cutter 35. The upper arm wing portions will also be collected on the first belt conveyor 33 and preferably in the same tray or pocket already holding the wing center pieces of the same carcass. This result can be obtained by synchronizing the advance of the belt conveyor 33 to that of the shackle modules 17 along the conveyor track 11. The wing and tailless carcasses will then be conveyed into a freezing unit 37. Prior to entering the freezing unit 37 the carcasses may be subjected to the optional cutting step A07 for removing any remnants of a neck skin. This can be done by conventional equipment as described above, known to the skilled person, but not indicated in FIG. 9. The freezing unit 37 is in the form of a tunnel, which in the described embodiment, includes three successive sections 39, 41, 43, each being accessible for maintenance by a respective inspection hatch 45, 47, 49. In this embodiment the freezing unit 37 is a cryogenic freezer in which a cryogenic liquid, such as liquid carbon dioxide of liquid nitrogen is injected. The vaporization of such liquid gasses chills and freezes the carcasses that enter the tunnel via a product inlet and emerge there from via a product outlet. Such tunnels are conventional and usually include means to control the injection of the cryogenic liquid in response to temperature sensors. A forced exhaust system is also provided to control the flow and full vaporization of cryogenic vapor and to prevent the cryogenic gasses from escaping from the product inlet and outlet or ambient air from entering the tunnel via the same openings. In particular the freezing tunnel 37 of the present invention uses fans as an agitating means of which only the electric motors 51 are visible in FIG. 9. The electric motors 51 drive fans on the inside of freezing tunnel 37 that create a turbulence in a direction transverse of the tunnel to enhance the temperature exchange between the carcasses in the tunnel and the cryogenic vapor, by intensified contact.

The carcasses exiting from the freezing unit 37 are transferred in a partly frozen state by the overhead conveyor 11 around the second return sprocket wheel 15, which is combined with a breast pre-cutter station 53 that will be described in more detail below, for performing the cutting steps A08 and A09. Along the reverse path of the conveyor 11, further cutting stations are arranged to perform the cutting steps A10, A11 and A12.

Figure 10:
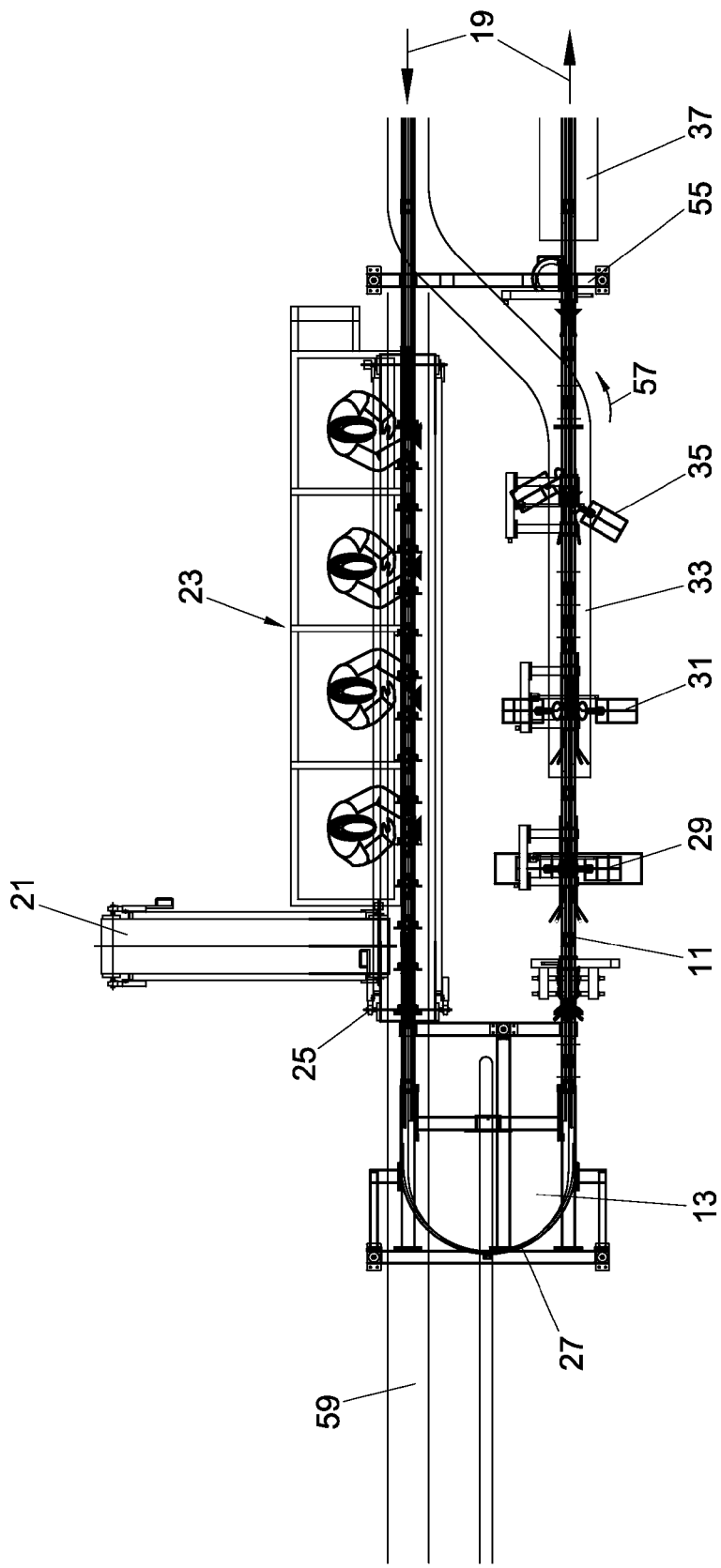
FIG. 10 is a partial plan view of a portion of the apparatus of FIG. 9, indicated therein as "A"
Figure 11:
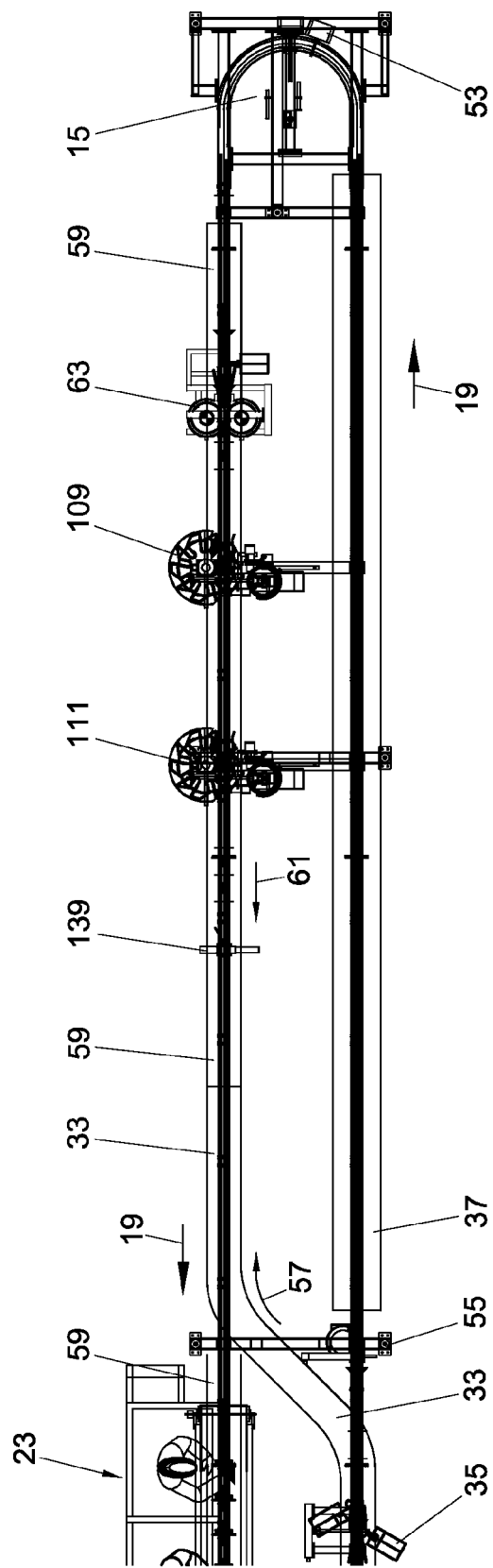
FIG. 11 is a partial plan view of a portion of the apparatus of FIG. 9, indicated therein as "B"

The apparatus as indicated in FIG. 9, thus includes a section A in which processing steps prior to freezing, are performed, and a section B for performing processing steps after freezing. FIGS. 10 and 11 are enlarged plan views of the sections A and B on the apparatus 1 of FIG. 9. FIG. 10 generally shows the positions of the infeed conveyor 21, the feeding station 23 where the carcasses are hung onto shackle modules by manual labour and the various cutting stations 25, 29, 31 and 35 for performing the cutting steps A02 through A06. Further visible in FIG. 10, is the optional neck skin cutter 55, just prior to the freezing tunnel 37, for performing the optional cutting step A07. As will now be explained in combined reference to FIGS. 10 and 11, the first belt conveyor 33 moves into the direction of arrows 57 and extends with a downstream end over a second belt conveyor 59 which moves in an opposite direction as indicated by arrow 61. The second belt conveyor 59 has its upstream end located between the breast pre-cutting station 53 and a breast splitter cutter 63 for performing the cutting step A10 on the poultry carcass. A downstream end of the second conveyor 59 is preferably located beyond the infeed conveyor 21 and tail cutter station 25, as indicated in FIG. 10. The downstream end of the first conveyor 33 thus unloads onto the second belt conveyor 59, so that meat products cut prior to freezing are combined with meat products cut after the step of freezing.

Figure 12:
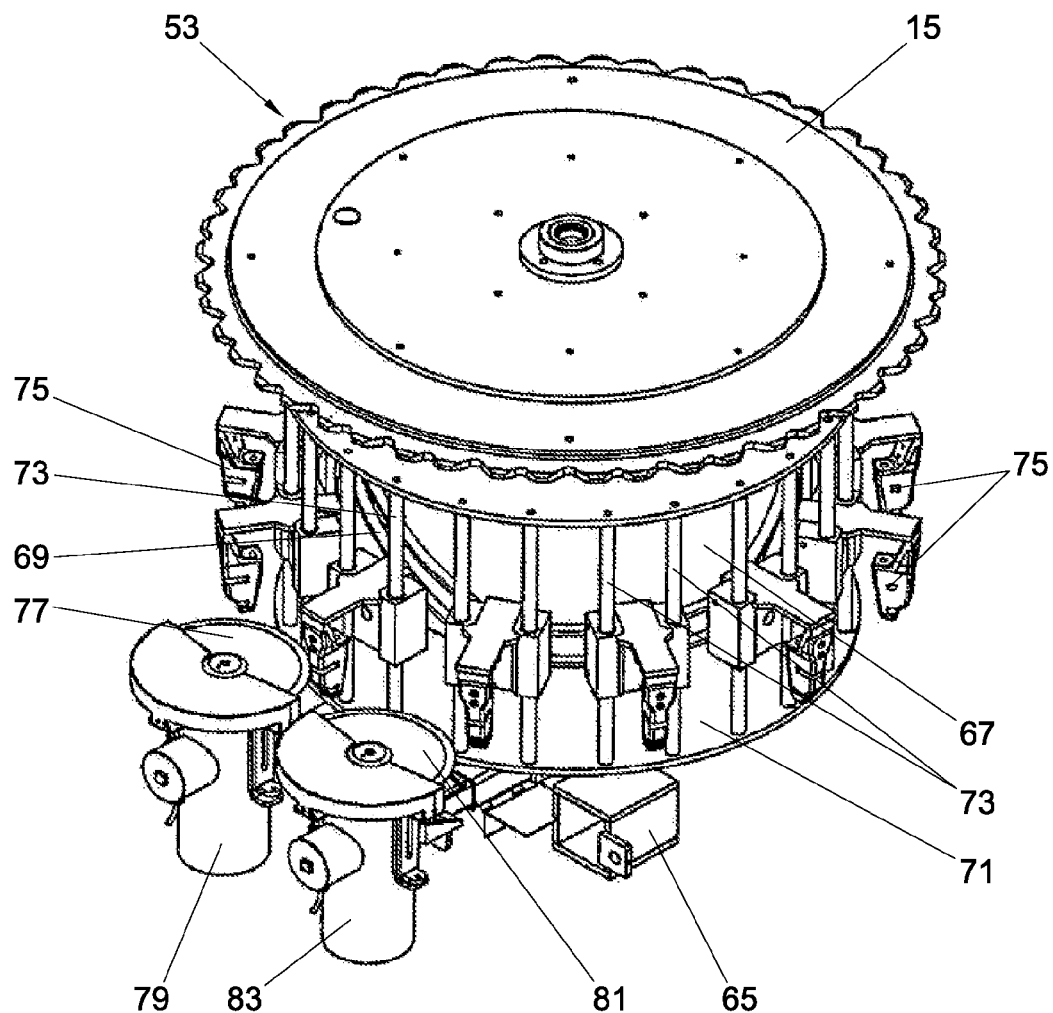
FIG. 12 illustrates a breast precutter station.

The breast pre-cutter station 53 is shown in more detail in FIG. 12. Mounted from a support frame 65 that can be attached to the frame 3 and/or uprights 9 of the apparatus 1, is a stationary cam drum 67. The stationary cam drum 67 has a circumferential cam track 69. The second return sprocket wheel 15 is rotatable supported on top of the stationary cam drum 67. The second return sprocket wheel 15 may be rotated either by a drive motor to drive the overhead conveyor 11, or be driven by the overhead conveyor when this is driven by other means, such as by the first return sprocket wheel 13. The second return sprocket wheel 15 also rotatably engages a revolving carrousel 71. The revolving carrousel 71 is provided with a plurality of pairs of vertically arranged guide bars 73 spaced about a periphery of the revolving carrousel 71 for rotation about the stationary cam drum 67. One mandrel 75 of a plurality of mandrels is arranged on each pair of vertical guide bars 73 for vertical movement between upper and lower positions. Each mandrel 75 engages the circumferential cam track 69 on the cam drum 67. While the shackle modules 17 with the suspended carcasses (not shown in FIG. 12) are moved with the overhead conveyor track 11 around the sprocket wheel 15, where they are moving in unison with the mandrels 75 on the revolving carrousel 71. The mandrels 75 while being guided along the stationary cam track 69 are first lowered into the visceral cavity of the carcass and thereafter raised therefrom by the revolving carrousel 71. The mandrels 75 each engage the visceral cavity of a carcass to accurately position and rigidly support the breast portion thereof for the partial breast cutting steps A08 and A09. The first partial breast cutting step A08 is performed by a first rotary disk cutter 77, driven by a first drive motor 79. The second partial breast cutting step A09 is performed by a second rotary disk cutter 81, driven by a second, drive motor 83. Each of the mandrels 75 may be provided with one or more recesses to accommodate the cutting depth of the respective first and second disk cutters 77, 81. Alternatively the first and second rotary cutters 77, 81 may also be arranged so that the second breast precutting step A09 precedes the first breast precutting step A08, to make a partial incision across the breast portion of an individual carcass.

Figure 13:
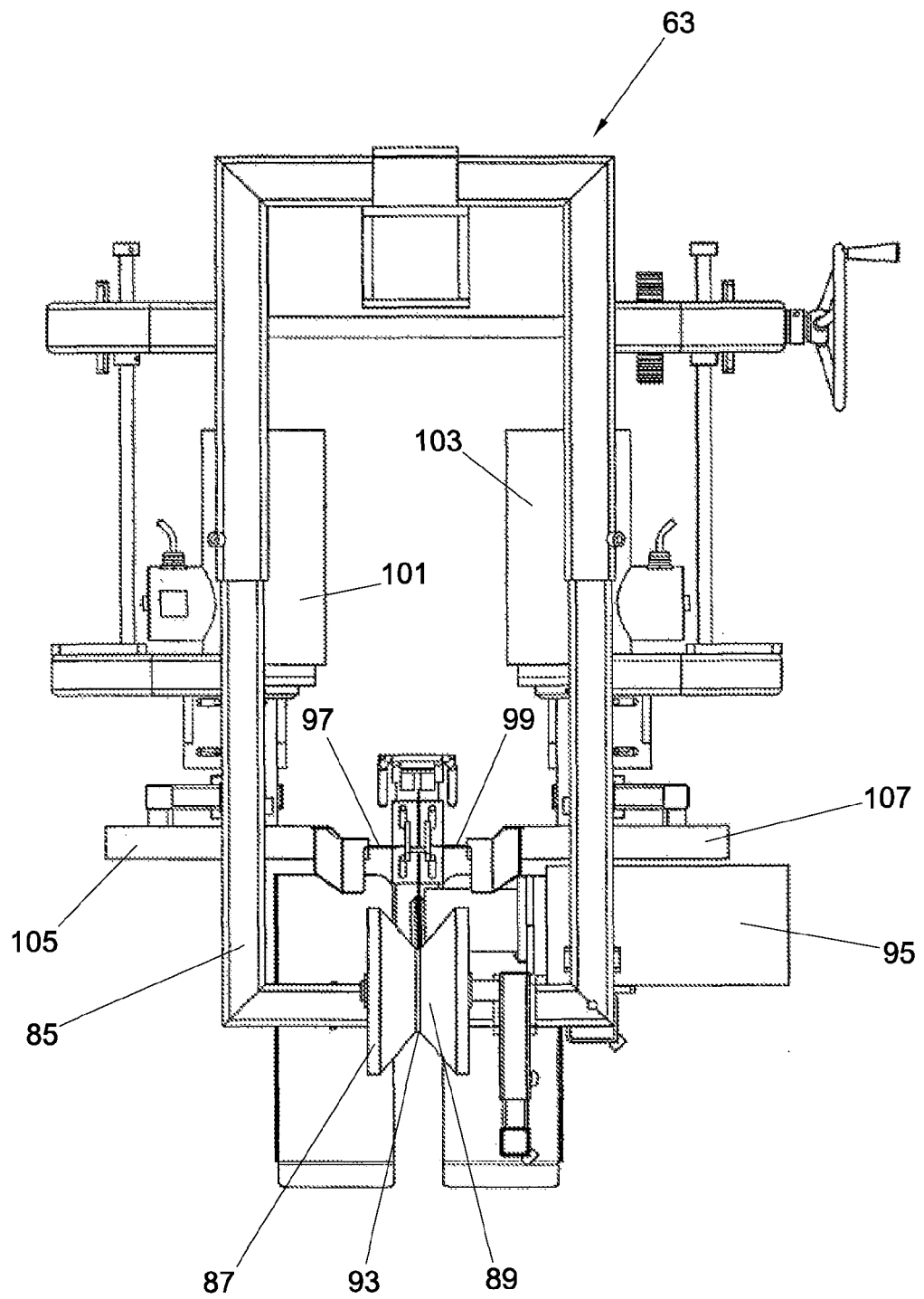
FIG. 13 is a front elevation of a breast cutter splitter.
Figure 14:
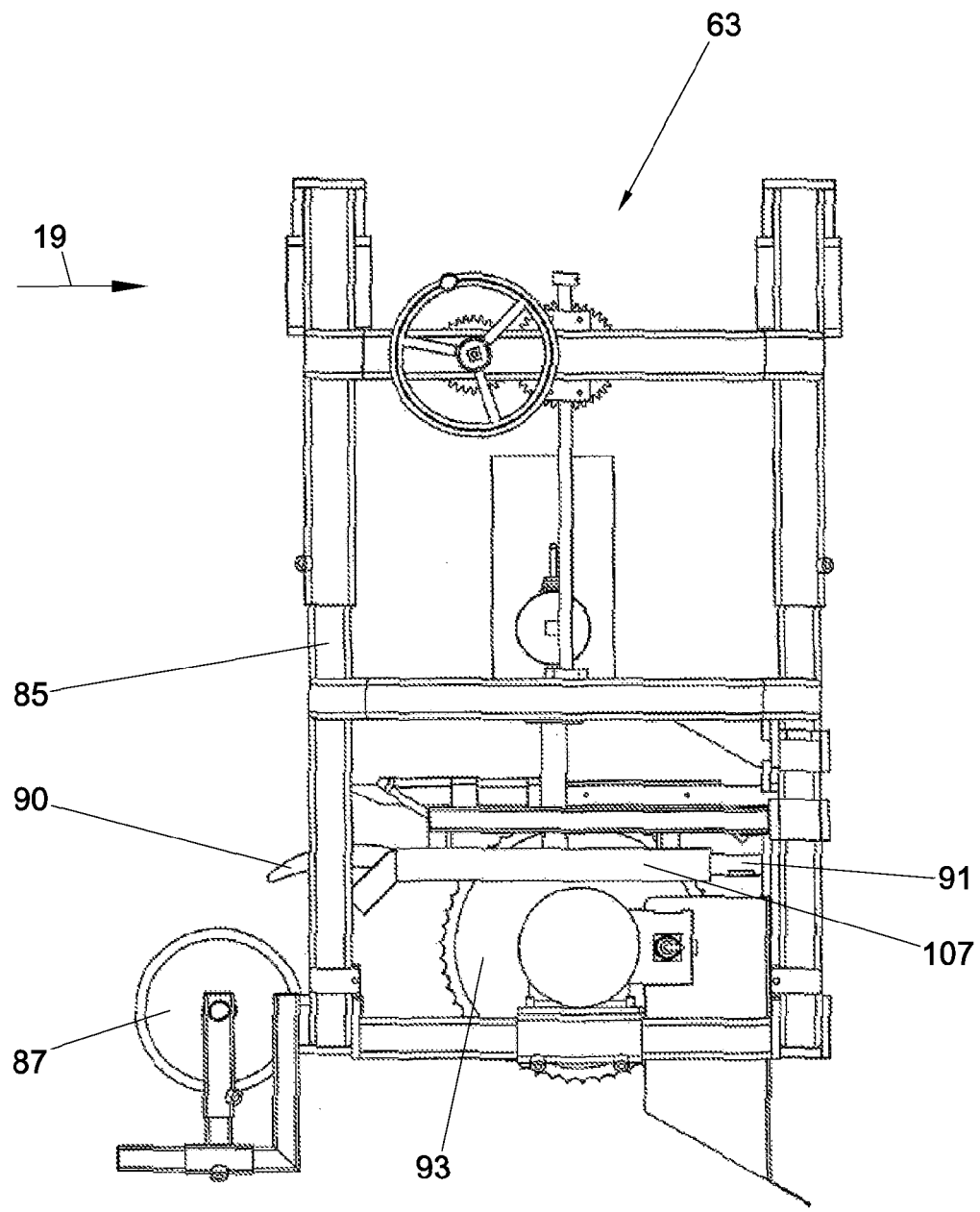
FIG. 14 is a side elevation of the breast cutter splitter of FIG. 13.
Figure 15:
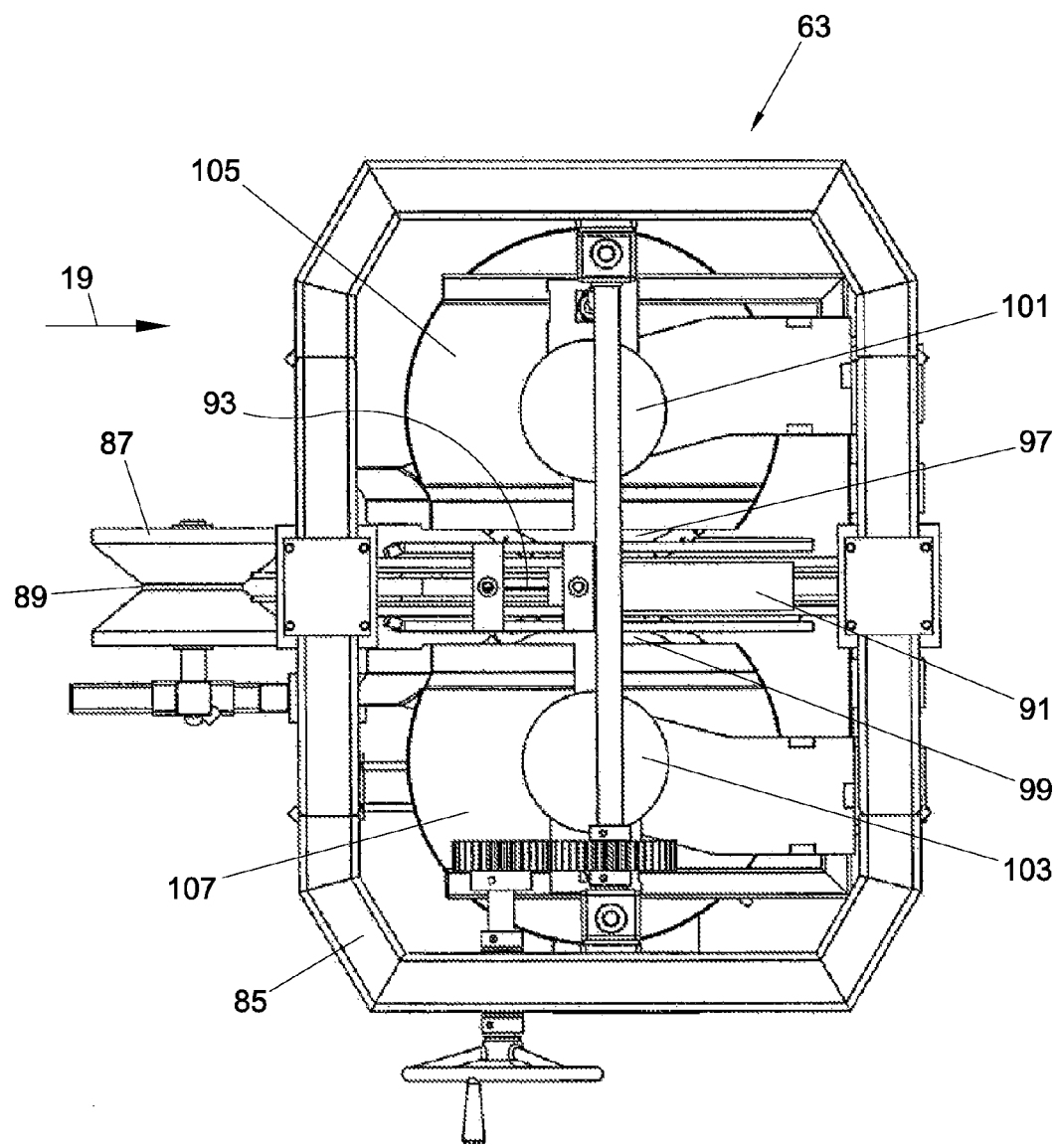
FIG. 15 is a top plan view of the breast cutter splitter of FIG. 13.

The carcasses progressing from the breast pre-cutter station 53 are each subsequently engaged by the breast cutter splitter 63, indicated in FIG. 11. This breast cutter splitter 63 will now be explained in reference to FIGS. 13, 14 and 15. FIG. 13 is a front elevation of the breast cutter splitter 63, forming the entrance for the carcass. In-between the breast pre-cutter station 53 and the breast cutter splitter 63 the carcass suspension shackles 17 are rotated, such that the carcass is advanced towards the breast cutter splitter 63 with its back facing in the direction of movement. The breast cutter splitter 63 has an adjustable frame 85 by which it is adjustable positioned in relation to the overhead conveyor 11 (deleted from FIGS. 13 to 15 for clarity). At its entrance the breast cutter splitter 63 is provided with a lower guide wheel 87 as guide means that align with the overhead conveyor 11, to engage the back of a suspended carcass. External protrusions of the carcass vertebrae are thereupon received in a circumferential groove 89 of the lower guide wheel 87. While each carcass is moved in the direction of directional arrow 19 (FIGS. 14 and 15) the visceral opening of each carcass is thereby aligned with a nose portion 90 of a guide mandrel 91. The guide mandrel 91 extends in a substantially horizontal direction through the breast cutter splitter 63 and a rotating carcass halving blade 93 extends partially through the guide mandrel 91. The halving blade 93 is rotatable driven by a driving motor 95. Confronting the portion of the halving blade 93 that extends above the guide mandrel 91 on each side thereof is a first and second breast cutter blade 97, 99. Each of the first and second breast cutter blades 97, 99 is driven by a respective first and second drive motor 101, 103. The first and second breast cutter blades 97 and 99 are cutting between the breast and back portions of each individual carcass and intersect with opposite ends of the pair of partial incisions made in the breast pre-cutter station 53 upstream of the breast cutter splitter 63. In this way meat products formed by the thus severed breast portions can be collected onto the second belt conveyor 59 being positioned underneath the breast cutter splitter 63. At the same time the halving blade 93 cuts between the legs of the individual carcass to split each carcass into a pair of half-carcasses, which remain suspended from the associated shackle module 17. For added safety the exposed circumferential portion of the breast cutter knife blades 97, 99 may be protected by hoods 105, 107.

Referring back to FIG. 11, the breast cutter splitter 63 is followed by a back cutter 109 for performing the back cutting step A11. The back cutter 109 is followed by a thigh and drumstick cutter 111 for performing the thigh and drumstick cutting step A12. Each of the back cutter 109 and the thigh and drumstick cutter 11 is very similar in construction. Hence only the thigh and drumstick cutter 111 will be described in detail with respect to FIGS. 16 and 17.

Figure 16:
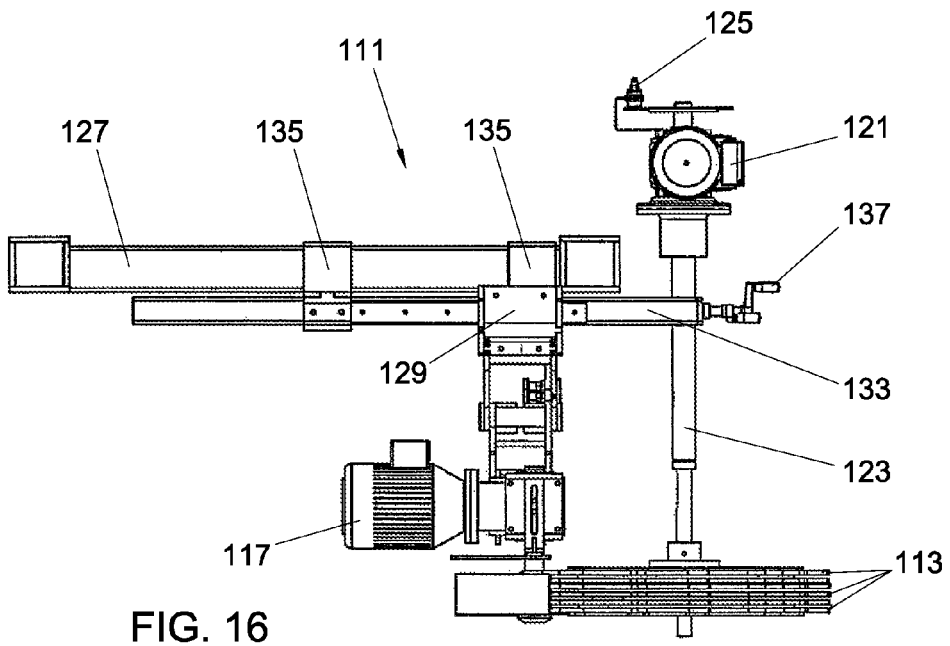
FIG. 16 is a front elevation of a thigh and drumstick cutter.

In FIG. 16 a front elevation of the thigh and drumstick cutter 111 is shown from its entrance site. A plurality of upper and lower guide plate wheels 113 are arranged on opposite sides of a plurality of parallel rotary cutting knives 115. In the described embodiment both the back cutter 109 and the thigh and drumstick cutter 111 are provided with three parallel cutting knives (115); three upper and three lower guide plate wheels (113), to each cut three meat products. It will be clear to the skilled person that the number of cutting knives (115) and guide plate wheels (113) can be less when larger meat products are desired. Additionally the upper and lower guide plate wheels (113) in-between cutting knives (115) can be combined so that a total of four guide plate wheels (113) suffice for a set of three cutting knives (115). The cutting knives 115 are rotated by a drive motor 117. Each guide plate wheel 113 has five pairs of recesses 119 around its periphery to engage the leg portions of a pair of half-carcasses suspended from an associated suspension shackle 17 (not shown in FIGS. 16 and 17, but conventional). In the case of the back cutter 109 the pairs of peripheral recesses of the guide plate wheels are adapted to engage the respective back portions of each pair of half-carcasses. Each suspension shackle, downstream of the breast cutter splitter 63 is turned through 90 degrees before progressing the carcasses to the back cutter 109 and remains in the same position for passage along the thigh and drumstick cutter 111. In this way the half-carcasses suspended from an individual suspension shackle enter the back cutter 109 and thigh and drumstick cutter 111 one after the other. The guide plate wheels 113 are arranged to engage such half-carcasses by the pairs of recesses 119 and move these past the rotating cutting knives 115. To this end the guide plate wheels 113 are rotated through increments of 72 degrees by a drive unit 121, and a drive shaft 123. The drive unit 121 is provided with sensor means 125 to accurately position the guide plate wheels 113 at the incremental rotative positions.

Figure 17:
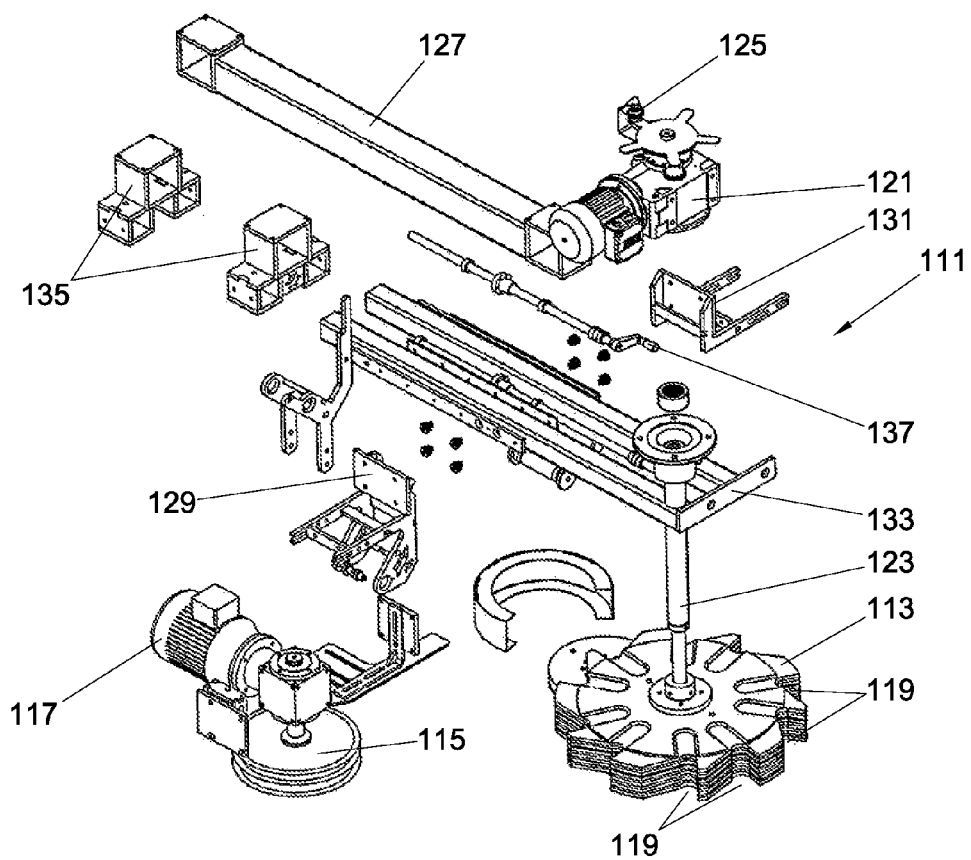
FIG. 17 is a perspective exploded view of the thigh and drumstick cutter of FIG. 16.

As further illustrated in FIGS. 16 and 17 the thigh and drumstick cutter 111 can be suspended from an overhead subframe 127 for attachment to the frame 3 of the apparatus as indicated in FIG. 9. Both the drive motor 117 of the cutting knives 115 and the drive unit 121 of the guide plate wheels 113 are mounted by a respective first and second mounting bracket 129, 131 to an adjusting frame work 133. The adjusting frame work 133 is carried by the subframe 127 by means of guiding brackets 135 for lateral adjustment with respect to the overhead conveyor track 11 (not shown in FIGS. 16 and 17). A crank spindle 137 of conventional design may be provided for laterally adjusting the position of the thigh and drumstick cutter 111 in respect of the overhead conveyor track.

In operation the individual half-carcasses engaged by the back cutter 109 are cut into a plurality of separate meat products which are collected onto the second belt conveyor 59. In a similar manner each leg remaining from the individual carcasses as a half-carcass are then engaged by the thigh and drumstick cutter 111 and cut into a further plurality of meat products to be collected on the second conveyor belt 59 running underneath.

Preferably transport of the several meat products by the first and/or second belt conveyors 53, 59 is arranged such that meat products from one and the same carcass are collected on the same location of the belt conveyor. Each belt conveyor 53, 59 may be provided with distinct partitioned collecting areas, advance of which is governed by the overhead conveyor.

As shown in FIG. 11, the process ends with an unloader station 139, which removes the leg remnants from the shackle modules for collection onto the second belt conveyor 59. Such unloader stations are generally known to the skilled person and do not require a detailed description in the context of the present invention.

It is thus believed that the operation and construction of the present invention will be apparent from the foregoing description. The invention is not limited to any embodiment herein described and, within the purview of the skilled person; modifications are possible which should be considered within the scope of the appended claims. Equally all kinematic inversions are considered inherently disclosed and to be within the scope of the present invention. The term comprising when used in this description or the appended claims should not be construed in an exclusive or exhaustive sense but rather in an inclusive sense. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Features which are not specifically or explicitly described or claimed may be additionally included in the structure according to the present invention without deviating from its scope.

The invention claimed is:

1. A method of automatically cutting individual poultry or fowl carcasses into a plurality of pieces forming various meat products, the method comprising:
conveying at least one previously eviscerated individual carcass along a processing path through a freezing unit and allowing at least a portion of the at least one carcass to become frozen;
conveying the at least one carcass to a cutting station upon its exit from the freezing unit; and
performing at least one partial cut through the frozen portion of the at least one carcass.

2. The method of claim 1, further comprising:
suspending a plurality of carcasses, comprising the at least one carcass, individually in an inverted position from modules in an overhead conveyor; and
moving the suspended carcasses in spaced relationship along the processing path.

3. The method of claim 2, further comprising removing a tail and wing tips from the at least one carcass prior to entering the freezing unit.

4. The method of claim 3, wherein the step of removing the tail from the at least one carcass prior to entering the freezing unit comprises:
engaging the at least one carcass by a tail cutter; and
severing the tail.

5. The method of claim 3, wherein the step of removing the wing tips from the at least one carcass prior to entering the freezing unit comprises:
engaging the at least one carcass by a wing tip cutter; and
severing the wing tips.

6. The method of claim 5, further comprising removing remaining wing elements from each individual carcass prior to entering the freezing unit.

7. The method of claim 6, further comprising:
engaging each individual carcass after moving downstream of the wing tip cutter by at least one wing cutter; and
removing the remaining wing elements from the carcass.

8. The method of claim 7, further comprising collecting the remaining wing elements on a first transport means.

9. The method of claim 1, further comprising removing a neck skin from the at least one individual carcass prior to entering into the freezing unit.

10. The method of claim 1, wherein the freezing unit comprises a tunnel containing a refrigerating gaseous atmosphere.

11. The method of claim 1, wherein the freezing unit comprises a freezing bath containing a refrigerating liquid.

12. A meat processing apparatus for automatically cutting individual poultry or fowl carcasses into pieces forming various meat products, the apparatus comprising:
a conveying means for conveying at least one previously eviscerated carcass in a direction and path of conveyance;
a freezing unit for receiving the at least one carcass along the path of conveyance, having an entrance upstream of the conveyance direction and an exit downstream of the conveyance direction, the freezing unit being arranged for allowing at least a portion of the at least one carcass to become frozen; and
a cutting station downstream of the freezing unit for performing at least one partial cut through a frozen portion of the at least one carcass.

13. The apparatus of claim 12, wherein the conveying means comprises:
an overhead track system; and
a plurality of modules moveable along the overhead track system in spaced relationship, each module being arranged to suspend one individual carcass in an inverted position.

14. The apparatus of claim 12, wherein the freezing unit comprises a tunnel containing a refrigerating gaseous atmosphere.

15. The apparatus of claim 14, wherein the refrigerating gaseous atmosphere is created by allowing an injected cryogenic liquid to evaporate.

16. The apparatus of claim 15, wherein an injection of the cryogenic liquid is controlled by a temperature sensor.

17. The apparatus of claim 12, wherein the freezing unit comprises a forced exhaust to control flow of the gaseous atmosphere.

18. The apparatus of claim 14, further comprising at least one fan to create a turbulence of the gaseous atmosphere in a transverse direction of the freezing tunnel.

19. A method of automatically cutting individual poultry or fowl carcasses into a plurality of pieces forming various meat products, the method comprising:
conveying at least one previously eviscerated individual carcass along a processing path through a freezing unit and allowing at least a portion of the at least one carcass to become frozen;
conveying the at least one carcass to a cutting station upon its exit from the freezing unit;
performing at least one partial cut through the frozen portion of the at least one carcass;
suspending a plurality of carcasses, comprising the at least one carcass, individually in an inverted position from modules in an overhead conveyor; and moving the suspended carcasses in spaced relationship along the processing path;
removing a tail and wing tips from the at least one carcass prior to entering the freezing unit, wherein the step of removing the wing tips from the at least one carcass prior to entering the freezing unit comprises: engaging the at least one carcass by a wing tip cutter; and severing the wing tips;
removing remaining wing elements from each individual carcass prior to entering the freezing unit;
engaging each individual carcass after moving downstream of the wing tip cutter by at least one wing cutter; and removing the remaining wing elements from the carcass; and
severing a wing center piece from a wing downstream of the wing tip cutter and upstream of the at least one wing cutter.

20. A method of automatically cutting individual poultry or fowl carcasses into a plurality of pieces forming various meat products, the method comprising:
conveying at least one previously eviscerated individual carcass along a processing path through a freezing unit and allowing at least a portion of the at least one carcass to become frozen;
conveying the at least one carcass to a cutting station upon its exit from the freezing unit; and
performing at least one partial cut through the frozen portion of the at least one carcass, wherein the step of performing at least one partial cut through the frozen portion of the at least one carcass comprises: successively engaging the at least one carcass downstream of the freezing unit by a breast pre cutter; and making the at least one partial cut across a breast portion of the at least one carcass.

21. The method of claim 20, wherein the step of making the at least one partial cut across a breast portion of the at least one carcass comprises making a pair of cuts, one above the other.

22. The method of claim, 20 further comprising:
moving the at least one carcass downstream of the pre cutter in succession to a carcass splitter; and
making at least one cut with the carcass splitter between the breast and back portions of the at least one carcass, the at least one cut intersecting with opposite ends of the at least one partial cut made upstream of the carcass splitter, wherein a breast portion is severed.

23. The method of claim 22, further comprising collecting the severed breast portions onto a second transport means.

24. The method of claim 23, further comprising cutting between legs of the at least one carcass to obtain a pair of half-carcasses, wherein the breast portion is severed.

25. The method of claim 24, further comprising:
successively engaging the at least one carcass or half-carcass downstream of the carcass splitter by a back cutter;
cutting the back with the back cutter into a plurality of separate back pieces; and
collecting the back pieces onto the second transport means.

26. The method of claim 25, further comprising:
engaging each leg remaining from the at least one carcass or half-carcass downstream of the back cutter by a thigh and drumstick cutter;
cutting the legs with the thigh and drumstick cutter into a plurality of separate leg pieces; and
collecting the plurality of leg pieces onto the second transport means.

27. A method of automatically cutting individual poultry or fowl carcasses into a plurality of pieces forming various meat products, the method comprising:
conveying at least one previously eviscerated individual carcass along a processing path through a freezing unit and allowing at least a portion of the at least one carcass to become frozen;
conveying the at least one carcass to a cutting station upon its exit from the freezing unit;
performing at least one partial cut through the frozen portion of the at least one carcass;
suspending a plurality of carcasses, comprising the at least one carcass, individually in an inverted position from modules in an overhead conveyor;
moving the suspended carcasses in spaced relationship along the processing path;
collecting leg remnants from the modules of the overhead conveyor onto the second transport means downstream of the thigh and drumstick cutter;
joining all pieces transported by the first and second transport means; and
collecting all pieces transported by the first and second transport means for further processing.

28. A meat processing apparatus for automatically cutting individual poultry or fowl carcasses into pieces forming various meat products, the apparatus comprising:
a conveying means for conveying at least one previously eviscerated carcass in a direction and path of conveyance;
a freezing unit for receiving the at least one carcass along the path of conveyance, having an entrance upstream of the conveyance direction and an exit downstream of the conveyance direction, the freezing unit being arranged for allowing at least a portion of the at least one carcass to become frozen; and
a cutting station downstream of the freezing unit for performing at least one partial cut through a frozen portion of the at least one carcass, wherein the cutting station downstream of the freezing unit comprises a breast pre-cutter that performs at least one partial cut across a breast portion of the at least one carcass.

29. The apparatus of claim 28, wherein the breast precutter comprises at least one mandrel capable of accurately positioning and rigidly supporting the breast portion of the at least one carcass upon insertion of the at least one mandrel into a visceral cavity of the at least one carcass.

* * * * *

UNITED STATES PATENT AND TRADEMARK OFFICE
CERTIFICATE OF CORRECTION

PATENT NO.           : 8,535,122 B2
APPLICATION NO.      : 12/797909
DATED                : September 17, 2013
INVENTOR(S)          : Jacobus Eliza Hazenbroek and Albert Hugo de Vree Page 1 of 1

It is certified that error appears in the above-identified patent and that said Letters Patent is hereby corrected as shown below:

Title Page:

Item (75) the identification of inventors should read as follows:

Hazenbroek; Jacobus Eliza (Oud-Beijerland, NL), de Vree; Albert Hugo (Oud-Beijerland, NL)

Signed and Sealed this
Fifth Day of November, 2013

Teresa Stanek Rea
*Deputy Director of the United States Patent and Trademark Office*